United States Patent [19]
Phillips

[11] Patent Number: 6,077,331
[45] Date of Patent: Jun. 20, 2000

[54] MOLECULAR SIEVE TYPE GAS SEPARATION APPARATUS AND METHOD

[75] Inventor: Robert John Phillips, Honiton, United Kingdom

[73] Assignee: Normalair-Garrett (Holdings) Limited, Yeovil, United Kingdom

[21] Appl. No.: 09/077,286
[22] PCT Filed: Nov. 28, 1996
[86] PCT No.: PCT/GB96/02934
  § 371 Date: Aug. 21, 1998
  § 102(e) Date: Aug. 21, 1998
[87] PCT Pub. No.: WO97/20616
  PCT Pub. Date: Jun. 12, 1997

[30] Foreign Application Priority Data
  Dec. 2, 1995 [GB] United Kingdom .................... 9524721

[51] Int. Cl.⁷ ................................................. B01D 53/047
[52] U.S. Cl. .................................... 95/12; 95/98; 95/105; 95/130; 96/111; 96/130; 96/144
[58] Field of Search ...................... 95/8, 11, 12, 96–98, 95/100–105, 130; 96/111, 130, 143, 144

[56] References Cited

U.S. PATENT DOCUMENTS

| | | | |
|---|---|---|---|
| 3,703,068 | 11/1972 | Wagner ........................................ | 95/11 |
| 3,922,149 | 11/1975 | Ruder et al. .......................... | 95/130 X |
| 4,197,095 | 4/1980 | White, Jr. et al. .................... | 96/130 X |
| 4,404,005 | 9/1983 | Hamlin et al. ............................. | 96/111 |
| 4,472,177 | 9/1984 | Sircar ......................................... | 95/11 |
| 4,516,424 | 5/1985 | Rowland ................................ | 95/11 X |
| 4,561,287 | 12/1985 | Rowland .................................... | 95/11 |
| 4,627,860 | 12/1986 | Rowland .................................... | 96/111 |
| 4,648,888 | 3/1987 | Rowland ..................................... | 95/8 |
| 4,661,124 | 4/1987 | Hamlin et al. . | |
| 4,687,013 | 8/1987 | Stevenson ............................. | 96/111 X |
| 4,693,730 | 9/1987 | Miller et al. ................................ | 95/8 |
| 4,783,205 | 11/1988 | Searle ....................................... | 96/111 |
| 4,822,384 | 4/1989 | Kato et al. ............................. | 96/111 X |
| 4,927,434 | 5/1990 | Cordes et al. ......................... | 96/130 X |
| 5,004,485 | 4/1991 | Hamlin et al. ........................ | 96/130 X |
| 5,071,453 | 12/1991 | Hradek et al. ............................ | 95/8 X |
| 5,486,226 | 1/1996 | Ross et al. ................................ | 95/11 |
| 5,529,607 | 6/1996 | Tan .............................................. | 95/12 |
| 5,593,478 | 1/1997 | Hill et al. ................................. | 96/111 |
| 5,733,359 | 3/1998 | Doong et al. ................................ | 95/8 |
| 5,746,806 | 5/1998 | Aylsworth et al. ........................... | 95/8 |

FOREIGN PATENT DOCUMENTS

| | | | |
|---|---|---|---|
| 0046369 | 2/1982 | European Pat. Off. .................... | 95/11 |
| 0129304 | 12/1984 | European Pat. Off. ................. | 96/111 |
| 0196157 | 10/1986 | European Pat. Off. ................. | 96/111 |
| 0207686 | 1/1987 | European Pat. Off. ................. | 96/111 |
| 2157057 | 6/1973 | France .................................... | 96/111 |
| 3835164 | 4/1989 | Germany ................................ | 96/111 |
| 57-071804 | 5/1982 | Japan ........................................ | 95/12 |
| 63-017008 | 1/1987 | Japan ........................................ | 95/11 |
| 62-245216 | 10/1990 | Japan ....................................... | 96/111 |
| 2029257 | 3/1980 | United Kingdom ....................... | 95/12 |
| 2154464 | 9/1985 | United Kingdom ...................... | 96/111 |

*Primary Examiner*—Robert Spitzer
*Attorney, Agent, or Firm*—Larson & Taylor

[57] ABSTRACT

A molecular sieve type gas separation apparatus (10) for separating product gas from a gas supply (14) includes at least one sieve bed (11–13) which during an adsorption charge phase of a cycle, adsorbs non product gas in the gas supply (14), and in a desorption regeneration phase of the cycle desorbs the previously adsorbed non product gas. The apparatus further includes an outlet (18) to which product gas is delivered during the adsorption charge phase, and an outlet (31) for non product gas during the desorption regeneration phase. A sensor (36) responsive to the concentration of a constituent in the product gas, and a control (20) to switch the apparatus (10) between the adsorption charge and desorption regeneration phases are further provided. The control (20) is adapted to adjust the duration of adsorption charge phase relative to the duration of the desorption regeneration phase in each cycle.

18 Claims, 4 Drawing Sheets

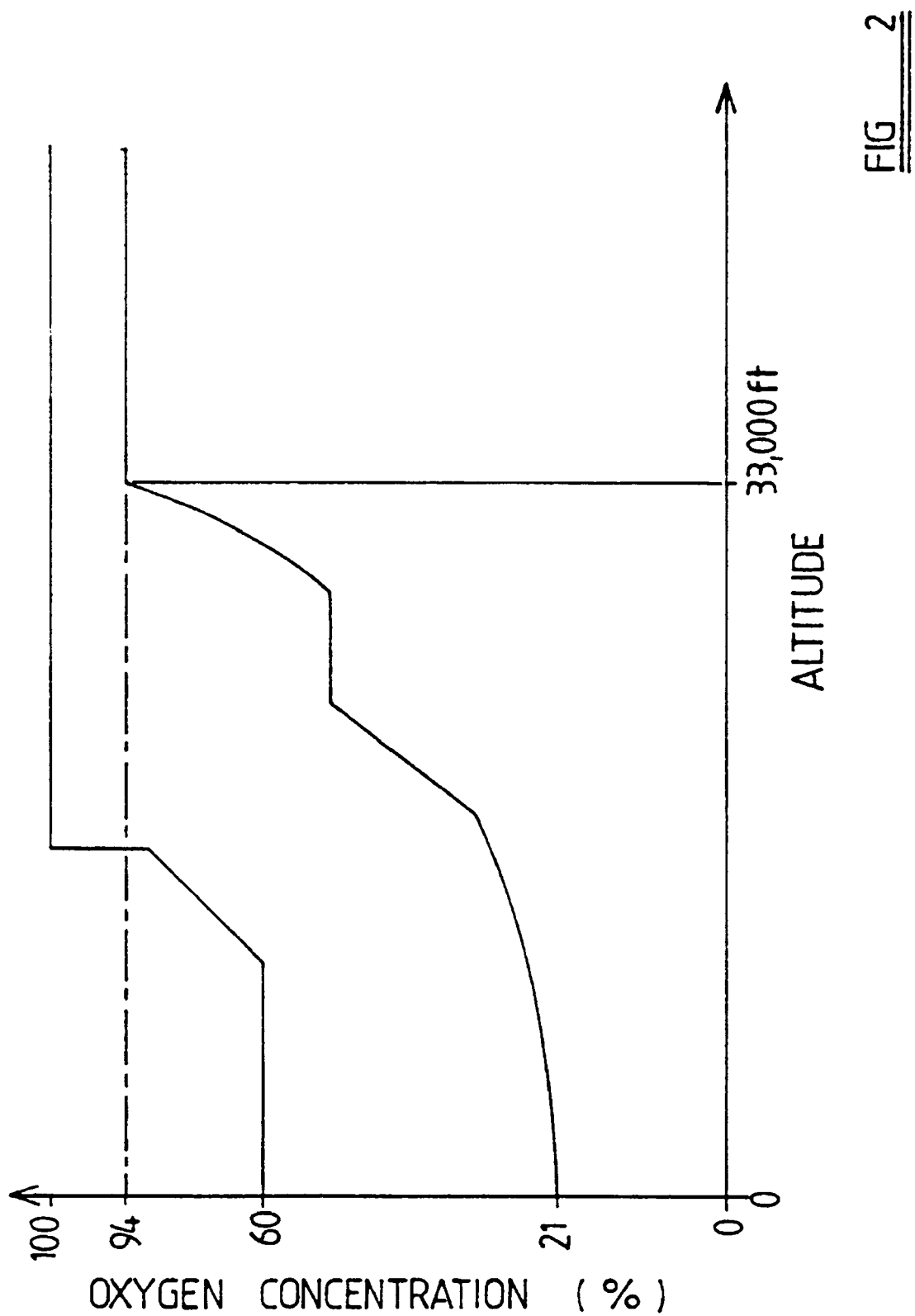

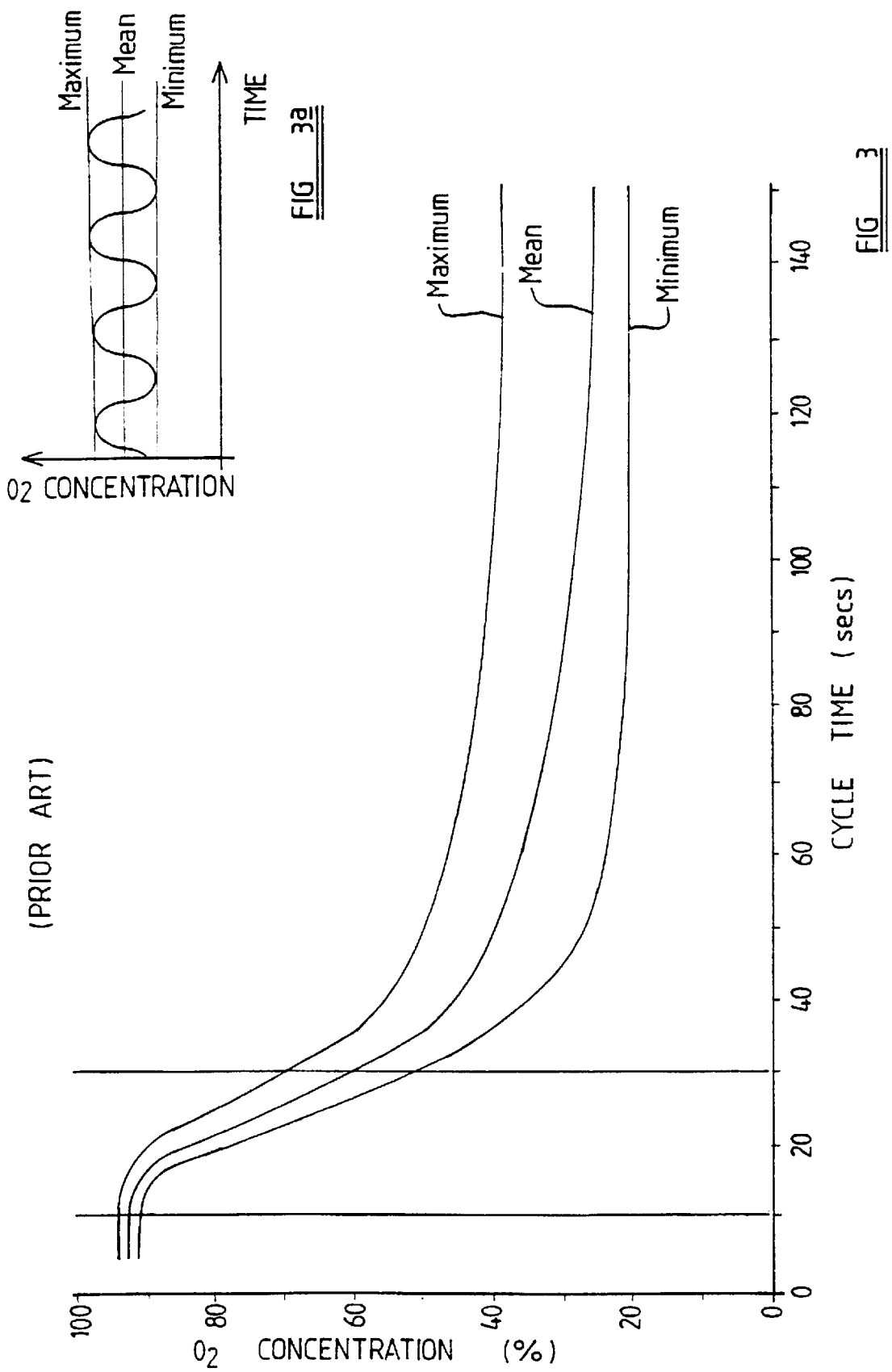

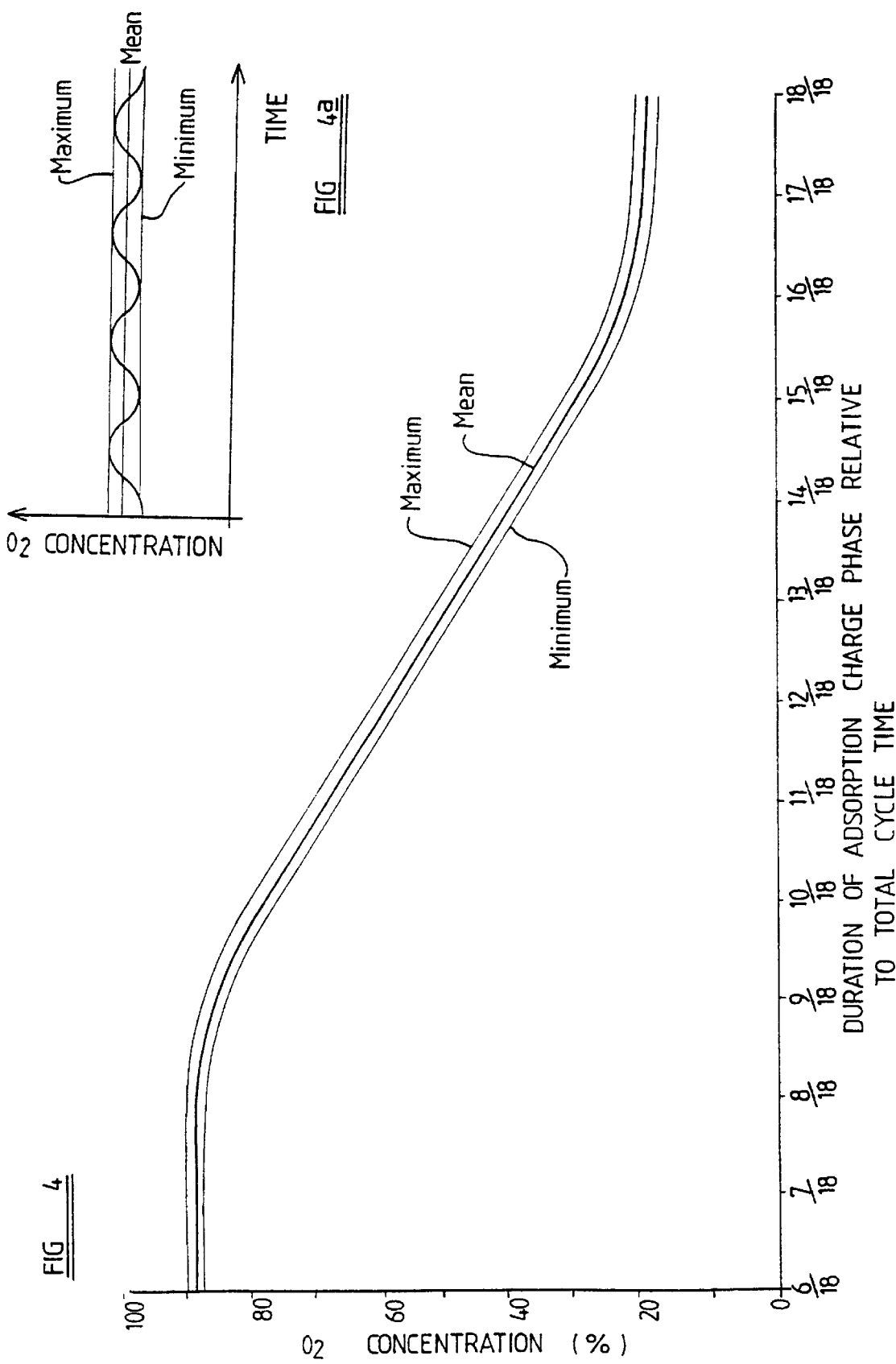

MOLECULAR SIEVE TYPE GAS SEPARATION APPARATUS AND METHOD

DESCRIPTION OF INVENTION

This invention relates to a molecular sieve type gas separation apparatus for separating product gas from a gas stream. A prior art molecular sieve type gas separation apparatus is described in prior European specification 0129304 and comprises in that example, three sieve beds which each contain a material which adsorbs nitrogen and other gases from a gas supply whilst permitting product gas, containing oxygen in that example, to pass from the apparatus and be used in an oxygen breathing system for example for an air crew in an aircraft.

In prior specification EP0129304, there is described an apparatus in which the operation of each sieve bed is cycled. In each cycle, each sieve bed is subjected to an adsorption charge phase in which nitrogen primarily, is adsorbed by the sieve bed, and a desorption regeneration phase in which the nitrogen, which is non product gas, is desorbed from the sieve bed. This is achieved, as is well known in the art, by introducing the gas supply to the sieve bed at a first pressure during the adsorption charge phase, and during the desorption regeneration phase, the bed is subjected to a second pressure, lower than the first.

For an air crew, it is necessary to provide increasing concentrations of oxygen in the product gas for breathing, with increasing altitude. In prior specification EP0129304, the concentration of oxygen in the product gas is varied by adjusting the overall cycle time for the or each sieve bed whilst the relative durations of the adsorption charge and desorption regeneration phases are retained substantially constant.

Although the prior art apparatus works satisfactorily in practice, there is a requirement to make the apparatus more effective.

Experiments into the operation of sieve beds have shown how the adsorbent material is better cleansed of the adsorbed gas by increasing the duration of the desorption regeneration phase in each cycle.

According to a first aspect of the invention we provide a molecular sieve type gas separation apparatus for separating product gas from a gas supply, the apparatus comprising at least one sieve bed which during an adsorption charge phase of a cycle, adsorbs non product gas in the gas supply, and in a desorption regeneration phase of the cycle desorbs the previously adsorbed non product gas, the apparatus further comprising outlet means to which product gas is delivered during the adsorption charge phase, and outlet means for non product gas during the desorption regeneration phase, sensor means responsive to the concentration of a constituent in the product gas, and control means to switch the operation of the sieve bed between the adsorption charge and desorption regeneration phases, characterised in that the control means is adapted to adjust the duration of adsorption charge phase relative to the duration of the desorption regeneration phase in each cycle.

Thus the applicants have found that by adjusting the duration of adsorption charge phase relative to the duration of desorption regeneration phase in each cycle of the sieve bed (or beds) improved control over the concentration of desired constituent in the product gas can be achieved.

Whereas in prior European specification 0129304 the cycle time is varied during an operation period, whilst the relative durations of adsorption charge and desorption regeneration phases are maintained generally constant, in the apparatus of the invention the overall cycle time for the or each sieve bed may be maintained generally constant during an operation period, whilst the relative durations of adsorption charge and desorption regeneration phases in each cycle are adjusted.

The invention provides various advantages. Particularly, the deviation of concentration of desired constituent in the product gas from a desired level can be greatly reduced in general and thus the risk of producing product gas with a lower or higher than acceptable concentration of desired constituent therein, is greatly reduced.

Furthermore, particularly where low concentrations of desired constituent in the product gas are desired, the duration of the desorption regeneration phase may be reduced, which means that the overall amount of gas supply which needs to be fed to the apparatus can be reduced, resulting in higher efficiency.

In a preferred arrangement, the apparatus includes a plurality of sieve beds which may be operated by the control means out of phase with each other such that in use, at least one of the beds is always operating in an adsorption charge phase and is thus producing product gas.

Preferably therefore, where there are N sieve beds switched between adsorption charge and desorption regeneration phases in common cycle times but, out of phase with one another, the apparatus may be operated such that the proportion of duration of adsorption charge phase to total cycle time in each bed is always greater than 1:N.

To achieve switching between the adsorption charge and desorption regeneration phases, each bed of the apparatus may have associated valves which are openable and closable by the control means to permit the introduction of the gas supply and delivery of the product gas during the adsorption charge phase, and venting of the non product gas during the desorption regeneration phase.

The apparatus may comprise a container containing the or each sieve bed, and although each valve may be a simple open/closed valve which permits appropriate gas to enter or leave the container, if desired at least one of the valves may be an active valve whereby the extent of opening and closing of the valve to permit one of the gas supply or product gas or non product gas to enter or leave the container is adjustable and/or the rate at which the valve may be switched between open and closed positions may be variable.

At the end of the desorption regeneration phase of the or each bed, prior to the next adsorption charge phase, if desired product gas may be introduced into the apparatus to purge remaining non product gas from the container.

Between at least some of the adsorption charge and desorption regeneration phases, there may be a pause phase in which no or minimal gas supply or product gas or non product gas is permitted to enter or leave the container.

Between at least some of the adsorption charge and desorption regeneration phases, there may be an overlap phase when at least two of the feeding of gas supply to the bed, product gas from the bed and non product gas from the bed, may occur simultaneously.

The invention is particularly but not exclusively applicable to a so called oxygen concentrator in which case the desired monitored constituent in the product gas may be oxygen and the or each sieve bed may contain sieve bed material capable of adsorbing nitrogen gas, so that the produced gas may be used for breathing, e.g. by an air crew member in an aircraft. Thus the control means may operate the apparatus so as to achieve an oxygen concentration in the product gas close to a target concentration, which may vary with altitude.

According to a second aspect of the invention we provide an aircraft having a gas separation apparatus according to the first aspect of the invention.

According to a third aspect of the invention we provide a method of operating an apparatus according to the first aspect of the invention, comprising the steps of sensing the concentration of a constituent in the product gas, and adjusting the duration of adsorption charge phase relative to the duration of desorption regeneration phase in each cycle for the or each sieve bed so as to achieve a concentration of constituent in the product gas within predetermined limits.

The invention will now be described with reference to the accompanying drawings in which:

FIG. 2 is a graph showing how the requirements for different oxygen concentration depending upon altitude, for breathing gas, varies.

FIG. 3 is a graphical illustration showing how the concentration of oxygen in the product gas changes in a prior art control method.

FIG. 3a is a graphical illustration showing cyclic swings in oxygen concentration by operating a prior art apparatus.

FIG. 4 is a graphical illustration similar to FIG. 3a, but showing how the oxygen concentration in the product gas varies by operating an apparatus according to the invention.

FIG. 4a is a graphical illustration showing cyclic swings in oxygen concentration by operating an apparatus in accordance with the invention.

Figure 1:
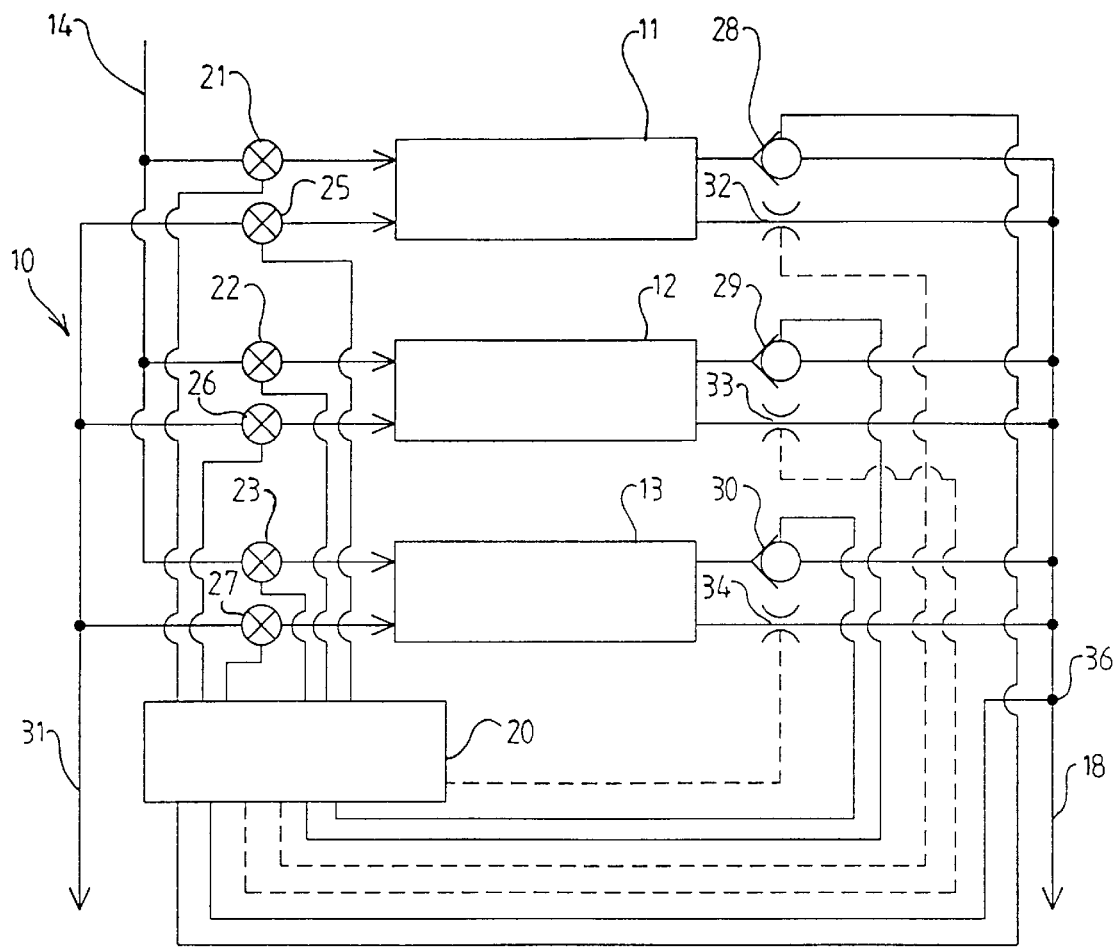
FIG. 1 is an illustrative view of a gas separation apparatus of the kind which is the subject of the invention.

Referring to FIG. 1 there is shown a molecular sieve type gas separation apparatus 10 which in this example is intended for supplying oxygen enriched air (product gas) to the air crew of an aircraft.

In this example, the apparatus 10 comprises three molecular sieve beds 11, 12, 13 suitably contained and arranged to receive an air (gas) supply from a source 14, such as a compressor stage of an engine of an aircraft, and to deliver product gas in the form of air that is enriched with oxygen to an outlet line 18.

The air supply 14 may be filtered prior to its delivery to the apparatus 10, and the pressure of the air (gas) supply may be regulated such that the air supply is delivered at a predetermined pressure.

Product gas passes from each of the beds 11 to 13 via the outlet line 18, to a suitable demand flow regulator means which is not shown, and does not form a part of this invention, by means of which an air crew member may breathe the product gas either on its own, or mixed with another gas such as air.

Each of the beds 11 to 13 are arranged to adsorb primarily nitrogen gas from the air supply 14 delivered to the beds 11 to 13, and to this end may contain molecular sieve material known as "zeolite", which passes oxygen so that the product gas delivered 18, is oxygen enriched air. By operating the apparatus 10 in accordance with the invention, the concentration of oxygen in the product gas can be varied, for example to suit different requirements.

Referring to FIG. 2, there is shown a graph which illustrates how the desired oxygen concentration in breathing gas varies with altitude, the graph indicating both the maximum and minimum desirable concentrations of oxygen for comfortable breathing, as the altitude increases. It can be seen that at lower altitude, a much lower oxygen concentration in the product gas is required, the minimum which needs to be available at ground level being the natural concentration of oxygen in the atmosphere (21%).

Referring again to FIG. 1 the apparatus 10 is controlled by a control means indicated at 20. Each of the beds 11 to 13 has an associated air supply inlet valve 21, 22, 23 respectively, and a (one-way) product gas outlet valve 28, 29, 30 respectively.

Each bed is operated cyclically, and in each cycle, there is an adsorption charge phase during which the appropriate air supply inlet valve 21 to 23 and product gas outlet valve 28 to 30 are open such that the air entering the bed 11 to 13, which is contained within a container, is separated into non product gas which is adsorbed by the material of the bed 11 to 13, whilst product gas passes over and/or through the bed and from the container of the bed 11 to 13 through the outlet valve 28 to 30 to the outlet line 18 from the apparatus 10. During the adsorption charge phase the material of the sieve bed 11 to 13 becomes increasingly charged with non product gas.

During a desorption regeneration phase, the appropriate air supply valve 21 to 23 and product gas outlet valve 28 to 30 are closed whilst an appropriate respective venting valve 25, 26, 27 from the bed 11 to 13 is opened such that the bed 11 to 13 is exposed via venting line 31 to atmospheric pressure which is a lower pressure than that of the air supply 14. Thus non product gas is desorbed from the respective bed 11 to 13 to cleanse and regenerate the bed 11 to 13, and passes from the respective container to vent outlet line 31, e.g. to the exterior of the aircraft.

Operation of the air supply valves 21 to 23, the product gas outlet valves 28 to 30 and the vent valves 25 to 27, are under the control of the control means 20.

Towards the end of the desorption regeneration phase, when the bed 11 to 13 has a pressure sufficiently low, product gas may pass back into the container of the bed 11 to 13, notwithstanding the product gas valves 28 to 30 are closed, via respective purge valves or orifices 32 to 34. The purge valves 32 to 34 only permit a small amount of product gas to pass back into the beds 11 to 13, to purge the beds 11 to 13 from remaining non product gas.

The apparatus 10 is operated so that the adsorption charge and desorption regeneration phases of the three beds 11 to 13 are phased, such that there is always at least one of the beds 11 to 13 operating in an adsorption phase, producing product gas.

An oxygen sensor 36 is provided in the product gas outlet line 18 to sense the concentration of oxygen, in the product gas. The output of sensor 36 is utilised by the control means 20 to control the operation of the beds 11 to 13 so as to vary the oxygen concentration in the product gas, and maintain the oxygen concentration within predetermined limits.

Referring to FIG. 3 there is shown graphically, how in a prior art apparatus the actual oxygen concentration in the product gas, varies with varying cycle time. Conventionally, an apparatus such as described in prior European specification 0129304, operates between two fixed cycle times only, for example of 9 or 30 seconds. In FIG. 3, the mean oxygen concentration indicated is the desired oxygen concentration in the product gas for varying altitude for breathing gas. The maximum and minimum oxygen concentrations indicated are the cyclic deviations from the mean due to control inaccuracy.

As the oxygen concentration in the product gas outlet line 18 sensed by sensor 36 varies, in the prior art method, the cycle time for each bed would be switched between 9 seconds and 30 seconds depending upon whether less or more oxygen is required in the product gas. For example, if the apparatus were operating at a fixed cycle time of 9 seconds for each bed, and sensor 36 in the product gas outlet line 18 determined that the oxygen concentration was rising towards the maximum desired concentration for a particular altitude, the cycle time would be switched to 30 seconds to reduce the oxygen concentration in the product gas.

This changing of cycle times can occur mid-cycle, or at the beginning or end of any cycle.

In FIG. 3a, there is illustrated the actual oxygen concentration sensed for a particular desired (mean) oxygen concentration from which it can be seen that the actual oxygen concentration in the product gas at the outlet line 18, swings between maximum and minimum oxygen concentration levels about the mean or desired oxygen concentration level. This swing may be cyclic as shown, but more commonly would be an irregular swinging about the mean oxygen desired concentration.

Of course, for examples, because in an aircraft the altitude may be continually changing and air crew breathing rate may be changing, a steady state condition such as indicated in FIG. 3a is never in practice reached. Hence, as the requirement for oxygen changes, as altitude changes, the swings of actual oxygen concentration in the outlet line 18, can be significant.

Referring now to FIG. 4, there is a graph similar to that shown in FIG. 3, but illustrating the result of operating the apparatus 10 in accordance with the invention. Again, the maximum, mean and minimum oxygen concentrations, in the product gas in the outlet line 18 are plotted, but instead of being plotted against single cycle times for each of the beds 11 to 13 of the apparatus 10, oxygen concentration is plotted against increasing relative duration of adsorption charge phase to total cycle time for adsorption charge phase and desorption regeneration phase of the beds 11 to 13. In the present example, the actual cycle time, which is fixed, is about 7.2 seconds and this cycle time is divided for the purposes of the graph, into 18 units.

At the left hand side of the graph, when oxygen concentration is at a maximum (approaching 94% of the product gas which is about the maximum attainable in practice), the sieve beds 11 to 13 are operated so that the relative duration of the adsorption charge phase to total cycle time for adsorption charge phase and desorption regeneration phase in each, is 6:18 and this relative duration increases in proportion up until 18:18 at the right hand side of the graph, when essentially, the sieve beds 11 to 13 are never operated in any desorption regeneration phase, such that the beds became saturated with non product gas, so that the maximum concentration of oxygen possible in the product gas is that naturally occurring in the atmosphere i.e. about 21%.

In accordance with the present invention the apparatus 10 is operated so that in response to the output from the oxygen sensor 36 in the output line 18 for the product gas, the relative duration of adsorption charge phase to desorption regeneration phase in each cycle, is changed so as to achieve a desired oxygen concentration. It can be seen from FIG. 4, that the distance between the maximum and minimum oxygen concentrations can be arranged to be much smaller than operating the apparatus by varying cycle time, as indicated in FIG. 3.

As a result, as can be seen in FIG. 4a, although the actual oxygen concentration still swings about a mean or desired oxygen concentration at a particular altitude (desired oxygen concentration), the swings are significantly less than compared with the arrangement of FIG. 3a in which actual cycle times are varied.

Of course with a three sieve bed arrangement, it is desirable to operate the beds out of phase so that at least one of the beds 11 to 13 is always contributing product gas i.e. is operated in an adsorption charge phase. Preferably the relative duration of adsorption charge phase to total cycle time for adsorption charge phase and desorption regeneration phase for each bed should never be less than 1:3 (6:18) or in the generality, where there are N beds, the relative duration of adsorption charge phase to desorption regeneration phase should never be less than 1:N so that one of the beds 11 to 13 is always producing product gas.

It will be appreciated from FIG. 4a that because the swing of actual oxygen concentration in the outlet line 18 is less about the mean than in previous arrangements, the risk of delivering a lower or higher than acceptable oxygen concentration in the product gas is significantly reduced. Furthermore, because the duration of the desorption regeneration phase is not a fixed duration, as in previous arrangements, overall, at least when measured over a plurality of cycles, the actual total duration of desorption regeneration phase time may be less than in conventional arrangements, resulting in a reduction in the quantity of feed air it is necessary to supply to the apparatus 10 and hence increasing effectiveness of the apparatus.

Whereas by operating the apparatus 10 using variable cycle times it may not be possible to reduce the oxygen concentration to a low enough desired level so that it is necessary to vent product gas so as to achieve a desired low oxygen concentration in the product gas to be breathed, in the arrangement of the invention it is possible to achieve extremely low levels of oxygen concentration by arranging for the duration of the adsorption charge phase relative to the total cycle time for adsorption charge phase and desorption regeneration phase to approach 1:1.

Various modifications are possible without departing from the scope of the invention.

It will be appreciated that FIG. 1 is representative only of an apparatus in accordance with the invention and that many changes may be made.

In a typical arrangement, each of the valves 21 to 23, and 25 to 27 are preferably solenoid operated valves, but could be of an alternative suitable construction. The valves 28 to 30 may be simple mechanically controlled non-return valves, or may be operated under the control means 20 as indicated in the drawing. If desired, the purge valves 32 to 34 may be simple orifices as shown, or non-return valves, or solenoid or other valves controlled by the control means 20, as indicated by the dotted lines in FIG. 1. The valves may be valves having linearly moveable spools, or rotatable valve members. The valves may be simply switched between fully opened and fully closed positions, or the extent of opening and closing of at least some of the valves may be controlled so that one of gas supply, product gas or non product gas may enter or leave the container containing a sieve bed 11 to 13 whilst another of the valves is fully or partially opened and/or the rate at which one or more of the valves may be switched between open and closed conditions may be made variable. In this way, the shock to which the apparatus 10 is subjected when any of the beds 11 to 13 of the apparatus is switched from adsorption charge to desorption regeneration phases may be decreased. This may be useful in reducing cyclic swings of oxygen concentration in the outlet line 18 still further.

Furthermore, rather than switching suddenly between adsorption charge and desorption regeneration phases, if desired and found useful, the apparatus 10 may be operated such that there is a pause phase between at least some of adsorption charge and desorption regeneration phases in which no or minimal gas supply or product gas or non product gas is permitted to enter or leave the particular container containing the sieve bed 11 to 13, and/or an overlap phase between at least some of the adsorption charge and desorption regeneration phases, in which at least two of the feeding of gas supply to the bed or beds 11 to 13, product gas from the bed or beds 11 to 13 and non product gas from the bed or beds 11 to 13 occurs simultaneously.

The sieve beds 11 to 13 may comprise rectangular, cylindrical or any other shape of container containing the active sieve bed material as is found most useful and efficient. Whereas an apparatus 10 having three active sieve beds 11 to 13 has been described, with the beds 11 to 13 being operated out of phase, an apparatus 10 having any number of sieve beds may be provided, and at least some of these may be operated in phase if desired.

Although the invention has been described in relation to an apparatus for producing oxygen enriched product gas, for breathing in an aircraft, the gas separation apparatus 10 may be utilised to separate other gases, in other applications, as desired.

I claim:

1. A method for separating product gas from a gas supply, said method comprising the steps of:
   providing a number N of sieve beds where the number N is three or more, each sieve bed functioning (i) during an adsorption charge phase of a cycle, to adsorb non product gas in the gas supply, and (ii) during a desorption regeneration phase of the cycle, to desorb the previously adsorbed non product gas;
   delivering product gas from each sieve bed to a first outlet during a respective adsorption charge phase;
   delivering non product gas from each sieve bed to a second outlet delivered during a respective desorption regeneration phase;
   sensing an actual concentration of a constituent in the product gas; and
   controlling the sieve beds to achieve a constituent concentration in the product gas close to a predetermined desired constituent concentration in the product gas which varies during an operation period of the sieve beds by
      switching each bed between the adsorption charge and desorption regeneration phases,
      maintaining the overall cycle time of each sieve bed generally constant during the operation period, and
      adjusting the duration of the adsorption charge phase relative to the duration of the desorption regeneration phase in each cycle (a) in response to the actual concentration of the constituent in the product gas sensed as the actual concentration varies from the predetermined desired constituent concentration in the product gas, and (b) such that a proportion of the duration of the adsorption charge phase to total cycle time in each said bed is always greater than 1:N, whereby the varying predetermined desired constituent concentration is generally present in the product gas produced.

2. A method for separating product gas from a gas supply as claimed in claim 1, wherein said controlling step further maintains at least one of the sieve beds in the adsorption charge phase during the operation period.

3. A method for separating product gas from a gas supply as claimed in claim 1, wherein
   said providing step provides each sieve bed in a container; and
   said controlling step further
      operates valves to switch each sieve bed between the adsorption charge phase and the desorption regeneration phase, and
      operates at least one of the valves as an active valve such that one of (a) the extent of opening and closing of the active valve to permit one of the gas supply, product gas or non product gas to enter or leave the container is adjustable or (b) the rate at which the active valve is switched between open and closed conditions is variable.

4. A method for separating product gas from a gas supply as claimed in claim 1, wherein
   said providing step provides each sieve bed in a container; and
   said controlling step further introduces product gas into each respective container to purge remaining non product gas from the respective container at the end of the desorption regeneration phase and prior to a next adsorption charge phase.

5. A method for separating product gas from a gas supply as claimed in claim 1, wherein
   said providing step provides each sieve bed in a container; and
   said controlling step further switches each sieve bed to a pause phase in which no or minimal gas supply, product gas or non product gas is permitted to enter or leave the respective container between at least some of the adsorption charge and desorption regeneration phases.

6. A method for separating product gas from a gas supply as claimed in claim 1, wherein
   said providing step provides each sieve bed in a container; and
   said controlling step further switches each sieve bed to an overlap phase when at least two of the feeding of (a) the gas supply to the container, (b) the product gas from the container, or (c) the non product gas from the container, occurs simultaneously between at least some of the adsorption charge and desorption regeneration phases.

7. A method for separating product gas from a gas supply as claimed in claim 1, wherein
   said sensing step senses oxygen as the constituent in the product gas;
   said controlling step achieves an oxygen concentration in the product gas which is desired and which desired oxygen concentration varies by altitude; and
   said providing step provides each sieve bed with a sieve bed material capable of adsorbing nitrogen gas so that the product gas may be used for breathing by an air crew member in an aircraft.

8. A molecular sieve gas separation apparatus for separating product gas from a gas supply, the apparatus comprising:
   a number N of sieve beds each of which (a) during an adsorption charge phase of a cycle, adsorbs non product gas in the gas supply, and (b) in a desorption regeneration phase of the cycle, desorbs the previously adsorbed non product gas, the number N being three or more,
   a first outlet means to which product gas is delivered from the sieve beds during a respective adsorption charge phase, a second outlet means to which non product gas is delivered from the sieve beds during a respective desorption regeneration phase, a sensor means to sense an actual concentration of a constituent in the product gas, and a control means to control the sieve beds so as to produce a predetermined desired constituent concentration in the product gas which predetermined desired constituent concentration varies during an operation period, said control means particularly functioning to switch each sieve bed between the adsorption charge and desorption regeneration phases, to maintain the overall cycle time of each sieve bed generally constant during the operation period, and to adjust the duration of the adsorption charge phase relative to the duration of the desorption regeneration phase in each cycle of each sieve bed (a) in response to the actual concentration of the constituent in the product gas sensed by the sensor means as the actual concentration varies from the predetermined desired constituent concentration in the product gas, and (b) such that a proportion of the duration of the adsorption charge phase to total cycle time in each said bed is always greater than 1:N, whereby the varying redetermined desired constituent concentration generally present in the product gas produced.

9. An apparatus according to claim 8 wherein the control means operates the apparatus such that in use, at least one of the beds is always operating in an adsorption charge phase.

10. An apparatus according to claim 8 wherein each bed of the apparatus is switched by the control means between adsorption charge and desorption phases by the operation of valves.

11. An apparatus according to claim 10 wherein the apparatus comprises a container containing each sieve bed, and at least one of the valves is an active valve whereby the extent of opening and closing of the valve to permit one of gas supply or product gas or non product gas to enter or leave the container, is adjustable, and/or the rate at which the valve may be switched between open and closed conditions is variable.

12. An apparatus according to claim 8, wherein the apparatus comprises a respective container containing each respective sieve bed, and at the end of the desorption regeneration phase of each bed prior to the next adsorption charge phase, product gas is introduced into the apparatus to purge remaining non product gas from the respective container.

13. An apparatus according to claim 8, wherein the apparatus comprises a respective container containing each respective said sieve bed, and between at least some of the adsorption charge and desorption regeneration phases, there is a pause phase in which no or minimal gas supply or product gas or non product gas is permitted to enter or leave the respective container.

14. An apparatus according to claim 8, wherein the apparatus comprises a respective container containing each respective sieve bed, and between at least some of the adsorption charge and desorption regeneration phases, there is an overlap phase when at least two of the feeding of gas supply to the respective container, product gas from the respective container and non product gas from the respective container occurs simultaneously.

15. An apparatus according to claim 8 wherein the desired constituent in the product gas is oxygen and each sieve bed contains sieve bed material capable of adsorbing nitrogen gas, so that the product gas may be used for breathing.

16. An apparatus according to claim 15 wherein the apparatus is provided in an aircraft and the product gas is breathed by an air crew member.

17. An apparatus according to claim 16 wherein the control means operates the apparatus so as to achieve an oxygen concentration in the product gas close to a target oxygen concentration in the product gas, the target concentration varying with altitude.

18. A molecular sieve gas separation apparatus for separating product gas from a gas supply, the apparatus comprising:

at least two sieve beds each of which (a) during an adsorption charge phase of a cycle, adsorbs non product gas in the gas supply, and (b) in a desorption regeneration phase of the cycle, desorbs the previously adsorbed non product gas;

a first outlet means to which product gas is delivered from the sieve beds during a respective adsorption charge phase;

a second outlet means to which non product gas is delivered from the sieve beds during a respective desorption regeneration phase;

a sensor means to sense an actual concentration of a constituent in the product gas; and a control means to control the sieve beds so as to produce a predetermined desired constituent concentration in the product gas which predetermined desired constituent concentration varies during an operation period, said control means particularly functioning to switch each sieve bed between the adsorption charge and desorption regeneration phases, to maintain the overall cycle time of each said sieve bed generally constant during the operation period, and to adjust the duration of the adsorption charge phase relative to the duration of the desorption regeneration phase in each cycle of each sieve bed in response to the actual concentration of the constituent in the product gas sensed by the sensor means as the actual concentration varies from the predetermined desired constituent concentration in the product gas, whereby the varying predetermined desired constituent concentration is generally present in the product gas produced.

* * * * *